(12) United States Patent
Sun et al.

(10) Patent No.: US 8,300,405 B2
(45) Date of Patent: Oct. 30, 2012

(54) AIRFLOW DUCT

(75) Inventors: Hong-Zhi Sun, Shenzhen (CN); Chen Chen, Shenzhen (CN); Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 270 days.

(21) Appl. No.: 12/903,083

(22) Filed: Oct. 12, 2010

(65) Prior Publication Data

US 2011/0292580 A1  Dec. 1, 2011

(30) Foreign Application Priority Data

May 28, 2010 (CN) .......................... 2010 1 0186016

(51) Int. Cl.
  *G06F 1/20* (2006.01)
  *H05K 7/20* (2006.01)
(52) U.S. Cl. ........... 361/679.49; 361/679.48; 361/679.5; 361/695; 361/697; 361/704; 165/185
(58) Field of Classification Search .. 361/679.48–679.5, 361/679.54, 690, 694–695, 697, 704, 709, 361/719; 165/185; 454/184
See application file for complete search history.

(56) References Cited

U.S. PATENT DOCUMENTS

| | | | | |
|---|---|---|---|---|
| 5,566,377 A * | 10/1996 | Lee | ................................. | 361/695 |
| 6,813,149 B2 * | 11/2004 | Faneuf et al. | ............ | 361/679.49 |
| 6,989,988 B2 * | 1/2006 | Arbogast et al. | .............. | 361/695 |
| 7,079,388 B2 * | 7/2006 | Faneuf et al. | ............ | 361/679.51 |
| 7,495,912 B2 * | 2/2009 | Long et al. | ..................... | 361/697 |
| 7,872,866 B1 * | 1/2011 | Wang | ............................. | 361/695 |
| 8,081,444 B2 * | 12/2011 | Xiao et al. | ............... | 361/679.49 |
| 8,243,437 B2 * | 8/2012 | Chou et al. | ............... | 361/679.49 |
| 2004/0095723 A1 * | 5/2004 | Tsai et al. | ..................... | 361/695 |
| 2007/0091566 A1 * | 4/2007 | Sun | ................ | 361/695 |
| 2012/0026680 A1 * | 2/2012 | Ke et al. | .................. | 361/679.49 |

FOREIGN PATENT DOCUMENTS

CN     201892911 U   *  7/2011

* cited by examiner

*Primary Examiner* — Robert J Hoffberg
(74) *Attorney, Agent, or Firm* — Altis Law Group, Inc.

(57) ABSTRACT

An airflow duct for guiding air toward two heat sink apparatuses in computer includes a duct body fixed in a computer case, a first air guide channel and a second air guide channel defined in the duct body. The duct body has an air inlet and an air outlet. The first air guide channel forms a first air outlet, which opens towards a first heat sink apparatus in the computer case. The second air guide channel forms a second air outlet, which opens towards a second heat sink apparatus in the computer case. The first and second air guide channels guide air from the air inlet to the first and second heat sink apparatuses, through the first and second air outlet openings to dissipate heat respectively from the first and second heat sink apparatuses. A first air guide channel height is greater than that of the second air guide channel.

8 Claims, 3 Drawing Sheets

AIRFLOW DUCT

BACKGROUND

1. Technical Field

The disclosure generally relates to airflow ducts, especially to an airflow duct for guiding air toward two heat sink apparatuses in a computer.

2. Description of Related Art

A heat dissipating module is generally mounted on a motherboard of an electronic device, such as a computer or a server, for dissipating heat generated by electronic components in the electronic device. With the continuous development of the computer industry, heat generated by the electronic components becomes greater due to faster speeds of the computers or servers. The conventional heat dissipating module cannot satisfy the requirements of a current computer or server system by itself, so an airflow duct is usually mounted above the heat dissipating module on the motherboard, for guiding the airflow, to allow increasing effectiveness of heat dissipation. An airflow duct includes an input opening and an output opening. There are often many components disposed on the motherboard around the airflow duct but not around the input opening. The plane of the input opening is often perpendicular to the motherboard and air mainly flows into the airflow duct through the input opening, so heat generated by the components around the input opening cannot be dissipated efficiently due to lack of airflow, which may cause some of the components to breakdown.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
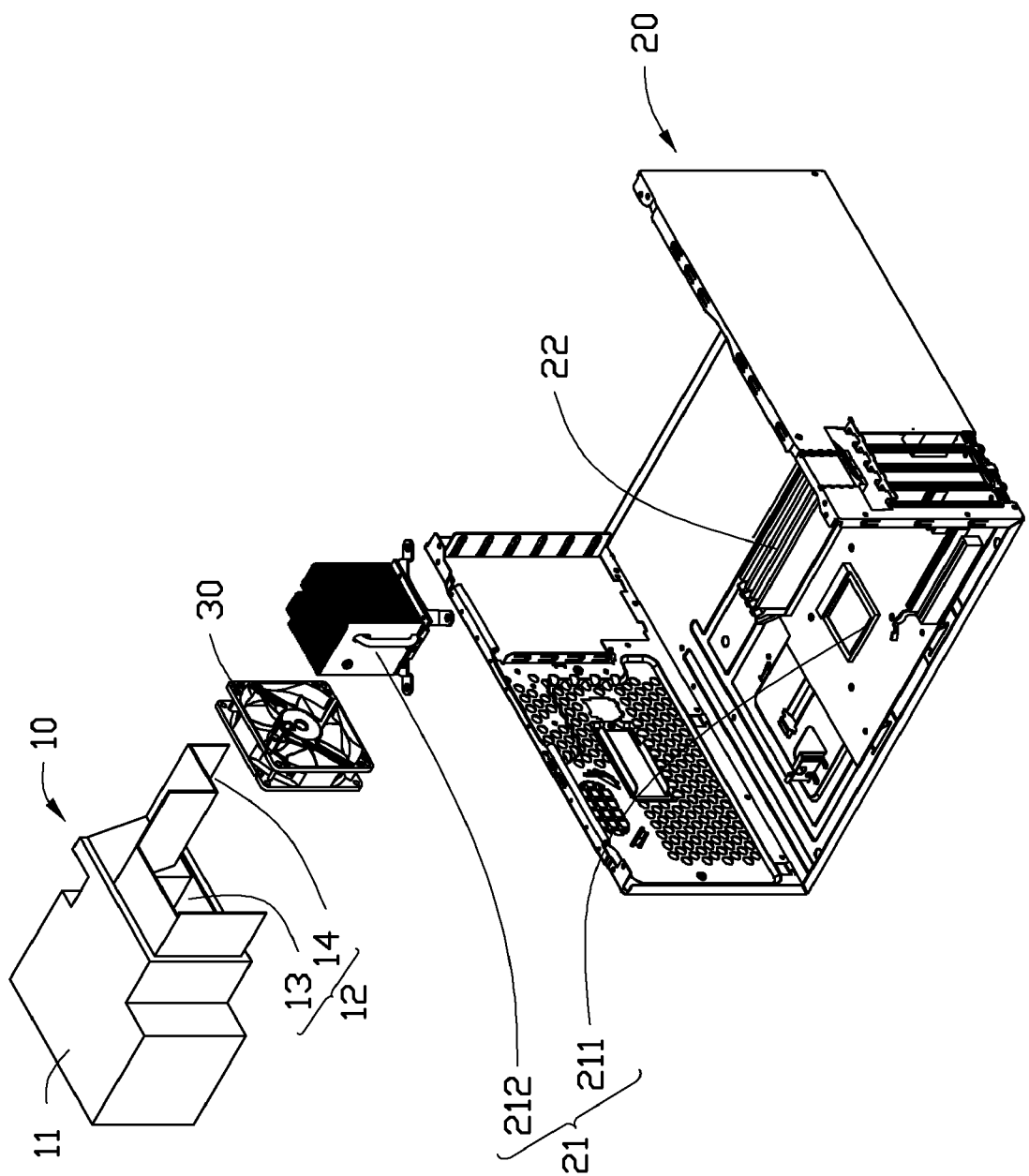
FIG. 1 is an exploded, isometric view of an embodiment of an airflow duct with a computer case.

Referring to FIG. 1, an airflow duct for guiding air toward two heat sink apparatuses in a computer 20 includes a duct body 10 having an air inlet 11 and an air outlet 12. The duct body 10 defines a first air guide channel (not labeled) and a second air guide channel (not labeled) therein. The air outlet 12 defines a first air outlet 13, and a second air outlet 14 corresponding respectively to the first and second air guide channels. The first and second air outlets 13, 14 respectively open towards a first heat sink apparatus 21 and a second heat sink apparatus 22 in the computer 20. The first and second air outlets 13, 14 guide air from the air inlet 11 to the first and second heat sink apparatuses 21, 22 for more efficient heat dissipating. In one embodiment, the first heat sink apparatus 21 includes a CPU 211 in the computer 20, and a heat sink 212 fixed on the CPU 211. The second heat sink apparatus 22 includes a number of memory chips (not labeled). A fan 30 is fixed in the duct body 10 to generate air through the first and second air guide channels in such a manner that air flows from the air inlet 11 to the first and second heat sink apparatuses 21, 22.

Figure 2:
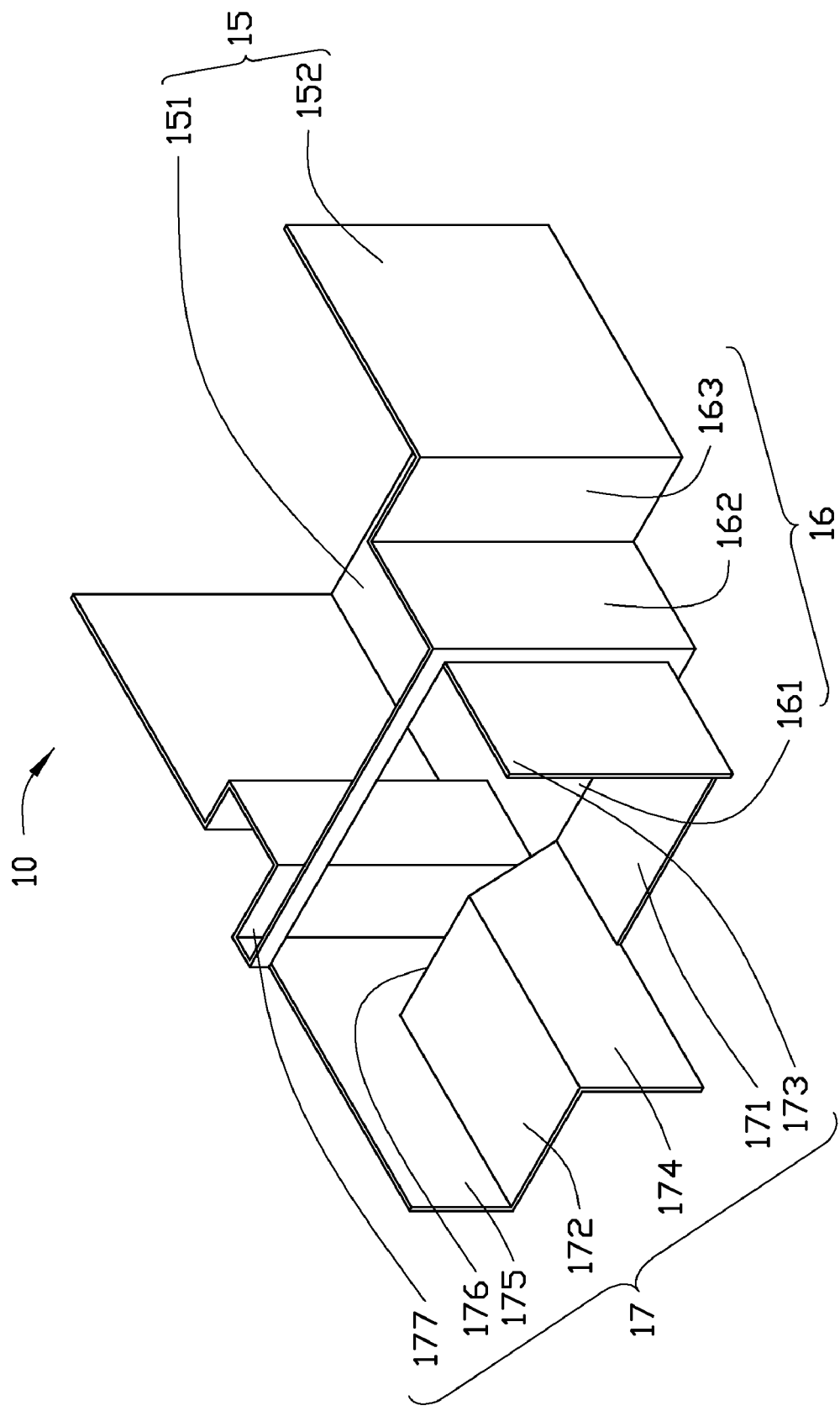
FIG. 2 is an isometric view of the airflow duct of FIG. 1.

Referring to FIG. 2, the duct body 10 includes an air inlet portion 15, an air guide portion 16 for receiving the fan 30 and an air outlet portion 17. The air inlet 11 and the air outlet 12 are respectively defined on the air inlet and outlet portions 15, 17. The air guide portion 16 is connected to the air inlet and outlet portions 15, 17. The air inlet portion 15 includes a top wall 151, and two side walls 152 substantially perpendicular to the top wall 151. A top wall 151 and the side walls 152 corporately define the air inlet 11 therebetween. The air guide portion 16 includes a top wall 161, two side walls 162 substantially perpendicular to the top wall 161, and two connection walls 163. The top walls 151, 161 are connected together. The connection walls 163 are respectively connected to the corresponding side walls 152, 162. In one embodiment, the width of the air guide portion 16 is less than that of the air inlet portion 15 and the air outlet portion 17.

The air outlet portion 17 includes two substantially parallel top walls 171, 172, side walls 173~175, a diagonal wall 176, and a connection wall 177. The top walls 161, 171 are connected together. The side walls 173, 174 are substantially perpendicular to the top wall 171. The side wall 174 is connected to the top walls 171, 172. The side wall 175 is substantially perpendicular to the top wall 172. The connection wall 177 is connected to the side walls 162, 175. The diagonal wall 176 is connected to the top walls 161, 172. The top wall 171 and the side walls 173, 174 corporately form the first air guide channel therebetween. The top wall 172, the side wall 175, and the diagonal wall 176 corporately form the second air guide channel therebetween. In one embodiment, the height of the first air guide channel is greater than that of the second air guide channel.

Figure 3:
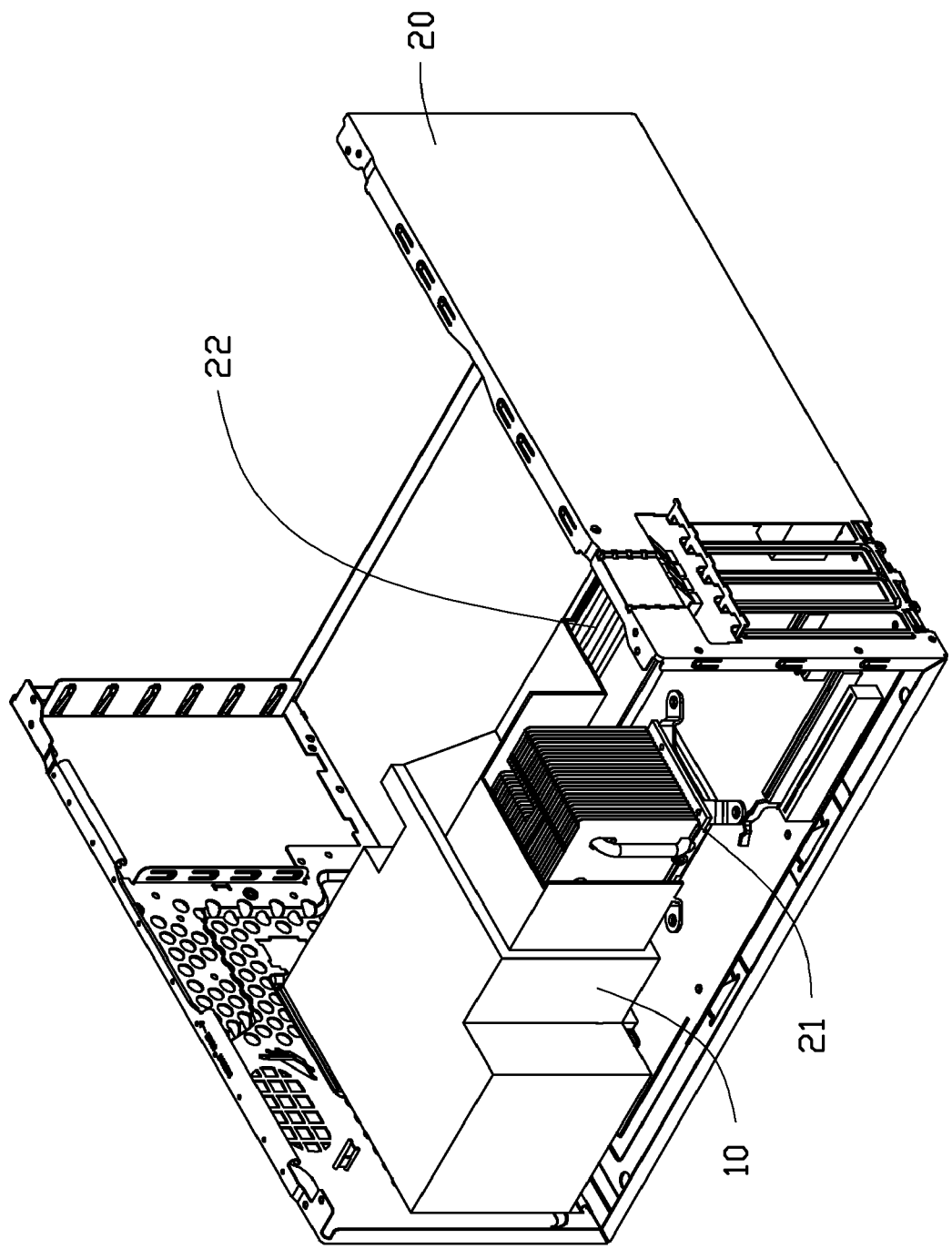
FIG. 3 is an assembled view of the airflow duct and computer case of FIG. 1.

Referring to FIG. 3, the first and second air guide channels respectively control the flow of air from the air inlet 11 to the heat sink 212 and the second heat sink apparatus 22. A temperature of the second heat sink apparatus 22 is largely decreased. Using a software application called ANSYS Icepak to simulate the efficiency and embodiment of the airflow duct. The simulated conditions are set to: initial ambient temperature about 35 degrees Celsius. The second heat sink apparatus 22 includes fourteen memory chips. The power dissipation of each memory chip is 4 W. The simulation according to the set conditions shows that the maximum temperature of the second heat sink apparatus 22 is about 84.051 degrees Celsius when using the air duct of the disclosure, and is about 104.805 degrees Celsius when using a common air duct. The maximum temperature of the second heat sink apparatus 22 is decreased nearly 20 degrees Celsius. The maximum temperatures of the CPU 211 and the second heat sink apparatus 22 are less than the safe operating temperatures. Therefore, the second heat sink apparatus 22 breakdowns are avoided. The performance is improved and there are less malfunctions of the second heat sink apparatus 22.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An airflow duct for guiding air toward two heat sink apparatuses in a computer, comprising:
   a duct body fixed in a computer case, the duct body having an air inlet and an air outlet, the duct body comprises:
   an air inlet portion, the air inlet portion comprises:
      a first top wall; and
      two first side walls substantially perpendicular to the first top wall; and
      a back side of the first to wall and the first side walls cooperatively form the air inlet therebetween;
   an air guide portion, the air guide portion comprises:
      a second top wall;
      two second side walls substantially perpendicular to the second top wall; and
      two first connection walls;
      the first top wall and second top wall are connected together; and
      each of the two first connection walls is connected to a corresponding one of the two first side walls and a corresponding one of the two second side walls; and
   an air outlet portion, the air outlet portion comprises:
      a third top wall;
      a fourth top wall substantially parallel to the third top wall;
      a third side wall;
      a fourth side wall;
      a fifth side wall;
      a diagonal wall; and
      a second connection wall,
      the second top wall and third top wall are connected together,
      the third side wall and fourth side wall are substantially perpendicular to the third top wall,
      the fourth side wall is connected to the third top wall and fourth top wall,
      the fifth side wall is substantially perpendicular to the fourth top wall,
      the second connection wall is connected to the fifth side wall and one of the two second side walls, and
      the diagonal wall is connected to the second top wall and fourth to wall,
   the air inlet and the air outlet are defined in the air inlet and outlet portions respectively, and
   the air guide portion is connected to the air inlet and outlet portions;
   a first air guide channel defined in the duct body forming a first air outlet opening in the air outlet, which opens towards a first heat sink apparatus in the computer case; and
   a second air guide channel defined in the duct body forming a second air outlet opening on the air outlet, which opens towards a second heat sink apparatus in the computer case; wherein the first and second air guide channels are capable of guiding air from the air inlet to the first and second heat sink apparatuses, through the first and second air outlet openings to dissipate heat respectively from the first and second heat sink apparatuses; and a height of the first air guide channel is greater than a height of the second air guide channel.

2. The airflow duct of claim 1, wherein a width of the air guide portion is less than a width of the air inlet portion and the width of the air guide portion is less than a width of the air outlet portion.

3. The airflow duct of claim 1, wherein the third top wall and the third and fourth side walls cooperatively form the first air guide channel therebetween; and the fourth top wall, the fifth side wall, and the diagonal wall cooperatively form the second air guide channel therebetween.

4. The airflow duct of claim 1, wherein the first heat sink apparatus comprises a CPU and a heat sink fixed on the CPU;
   the second heat sink apparatus comprises a number of memory chips; and
   a fan is fixed in the air guide portion.

5. An airflow duct assembly for guiding air toward two heat sink apparatuses in a computer, comprising:
   a computer case;
   a first heat sink apparatus fixed in the computer case;
   a second heat sink apparatus fixed in the computer case beside the first heat sink apparatus;
   a duct body fixed in the computer case, the duct body having an air inlet and an air outlet, the duct body comprises:
   an air inlet portion, the air inlet portion comprises:
      a first top wall; and
      two first side walls substantially perpendicular to the first to wall; and
      a back side of the first to wall and the first side walls cooperatively form the air inlet therebetween;
   an air guide portion, the air guide portion comprises:
      a second top wall;
      two second side walls substantially perpendicular to the second top wall; and
      two first connection walls;
      the first top wall and second top wall are connected together; and
      each of the two first connection walls is connected to a corresponding one of the two first side walls and a corresponding one of the two second side walls; and
   an air outlet portion, the air outlet portion comprises:
      a third to wall;
      a fourth to wall substantially parallel to the third to wall;
      a third side wall;
      a fourth side wall;
      a fifth side wall;
      a diagonal wall; and
      a second connection wall,
      the second top wall and third top wall are connected together,
      the third side wall and fourth side wall are substantially perpendicular to the third top wall,
      the fourth side wall is connected to the third top wall and fourth top wall,
      the fifth side wall is substantially perpendicular to the fourth top wall,
      the second connection wall is connected to the fifth side wall and one of the two second side walls, and
      the diagonal wall is connected to the second top wall and fourth top wall,
   the air inlet and the air outlet are defined in the air inlet and outlet portions respectively, and
   the air guide portion is connected to the air inlet and outlet portions;
   a first air guide channel defined in the duct body forming a first air outlet opening on the air outlet which opens towards the first heat sink apparatus; and a second air guide channel defined in the duct body forming a second air outlet opening on the air outlet which opens towards the second heat sink apparatus; and a fan fixed in the duct body to generate air through the first and second air guide channels in such a manner that air flows from the air inlet to the first and second heat sink apparatuses; and wherein a height of the first air guide channel is greater than a height of the second air guide channel.

6. The airflow duct assembly of claim 5, wherein a width of the air guide portion is less than a width of the air inlet portion and the width of the air guide portion is less than a width of the air outlet portion.

7. The airflow assembly of claim 5, wherein the third top wall and the third and fourth side walls cooperatively form the first air guide channel therebetween; and the fourth top wall, the fifth side wall, and the diagonal wall cooperatively form the second air guide channel therebetween.

8. The airflow duct assembly of claim 5, wherein the first heat sink apparatus comprises a CPU and a heat sink fixed on the CPU; and the second heat sink apparatus comprises a number of memory chips.

* * * * *